(12) United States Patent
Metzger et al.

(10) Patent No.: US 10,151,078 B1
(45) Date of Patent: Dec. 11, 2018

(54) BLADE CONTROL BELOW DESIGN

(71) Applicant: Caterpillar Trimble Control Technologies LLC, Dayton, OH (US)

(72) Inventors: Tony R. Metzger, Congerville, IL (US); Bruce J. Wiewel, East Peoria, IL (US); Robert L. Powers, East Peoria, IL (US); Richard R. Evenson, Apex, NC (US)

(73) Assignees: Caterpillar Trimble Control Technologies LLC, Dayton, OH (US); Caterpillar Inc., Peoria, IL (US)

( * ) Notice: Subject to any disclaimer, the term of this patent is extended or adjusted under 35 U.S.C. 154(b) by 60 days.

(21) Appl. No.: 15/602,592

(22) Filed: May 23, 2017

(51) Int. Cl.
*E02F 3/84* (2006.01)
*E02F 9/20* (2006.01)
*E02F 3/76* (2006.01)
*E02F 3/815* (2006.01)
*G01S 19/24* (2010.01)
*E02F 9/26* (2006.01)

(52) U.S. Cl.
CPC ............ *E02F 3/844* (2013.01); *E02F 3/7609* (2013.01); *E02F 3/8152* (2013.01); *E02F 9/2029* (2013.01); *E02F 3/7618* (2013.01); *E02F 9/265* (2013.01); *G01S 19/24* (2013.01)

(58) Field of Classification Search
CPC ....... E02F 3/844; E02F 3/7609; E02F 9/2029; E02F 3/8152; E02F 3/7618; E02F 9/265; G01S 19/24
See application file for complete search history.

(56) References Cited

U.S. PATENT DOCUMENTS

| 5,538,084 | A | 7/1996 | Nakayama et al. |
| 2014/0032132 | A1 | 1/2014 | Stratton et al. |
| 2015/0050110 | A1 | 2/2015 | Matsuyama et al. |
| 2018/0245317 | A1* | 8/2018 | Ready-Campbell .... E02F 3/434 |

OTHER PUBLICATIONS

The International Search Report and the Written Opinion of the International Searching Authority for Application No. PCT/US2018/032979, dated Aug. 2, 2018, 14 pages.

* cited by examiner

*Primary Examiner* — Yuen H Wong
(74) *Attorney, Agent, or Firm* — Kilpatrick Townsend & Stockton

(57) ABSTRACT

A method of controlling a blade of an earthmoving system is disclosed. The method includes enabling independent blade control so that the blade is controllable independent of the terrain contour design while a cutting edge of the blade is beneath the terrain contour design, and receiving first sensor signals from one or more first sensors of the earthmoving system, where the sensor signals indicate that the cutting edge of the blade is within a threshold distance from the terrain contour design. In response to receiving the first sensor signals, the method automatically controls the cutting edge of the blade to the terrain contour design, where the movement of the blade is dependent on the terrain contour design.

20 Claims, 5 Drawing Sheets

BLADE CONTROL BELOW DESIGN

BACKGROUND OF THE INVENTION

The present application relates to an earthmoving system, for example a bulldozer, for contouring a tract of land to a desired finish shape and, more particularly, to a system in which the position of the cutting tool is controlled based on information from GPS receivers and cutting tool position sensors, such as gyroscopic sensors and accelerometers.

Various control arrangements have been developed to control earthmoving devices, such as bulldozers, so that a tract of land can be graded to a desired level or contour, for example, known as a terrain contour design. A number of systems have been developed in which the position of the earthmoving apparatus is determined with GPS receivers. In such systems, a site plan is developed with the desired terrain contour design. The terrain contour design may be a representation of the topology of the tract of land as designed. The terrain contour design and the tract survey may be stored in the computer control system on the bulldozer. From the terrain contour design and the tract survey, amounts of cut or fill needed in specific areas of the tract to produce the desired terrain contour design may be determined.

The earthmoving apparatus determines the position of the cutting tool of the bulldozer using the GPS receivers and/or other sensors mounted on the bulldozer body or on masts attached to the blade of the bulldozer. The earthmoving apparatus determines the position of the cutting tool based also on the position sensors located on various mechanical control devices of the earthmoving apparatus. A computer control system calculates the blade position for the blade based on the terrain contour design and the tract survey and on the detected position of the blade. The blade position or a blade position error may be displayed for the operator of the bulldozer who can then make the appropriate adjustments manually. Alternatively, the computer may automatically control the position of the blade to reduce blade position error.

BRIEF SUMMARY OF THE INVENTION

One inventive aspect is a method of controlling a blade of an earthmoving system. The method includes accessing data representing a terrain contour design, enabling independent blade control so that the blade is controllable independent of the terrain contour design while a cutting edge of the blade is beneath the terrain contour design, and moving the cutting edge of the blade to a position beneath the terrain contour design. The method also includes receiving first control signals, and controlling the blade in response to the received first control signals while the cutting edge of the blade is beneath the terrain contour design, where the movement of the blade is independent of the terrain contour design, and thereafter, moving the cutting edge of the blade from beneath the terrain contour design to a location within a threshold distance from the terrain contour design. The method also includes receiving first sensor signals from one or more first sensors of the earthmoving system, where the sensor signals indicate that the cutting edge of the blade is within the threshold distance from the terrain contour design, and in response to receiving the first sensor signals, automatically controlling the cutting edge of the blade to the terrain contour design, where the movement of the blade is dependent on the terrain contour design.

Another inventive aspect is an earthmoving system. The earthmoving system includes a blade including a cutting edge and a controller configured to access data representing a terrain contour design, and to generate first control signals for controlling the position of the blade. The system also includes a blade control system configured to control the blade in response to the first control signals while the cutting edge of the blade is beneath the terrain contour design, where the movement of the blade is independent of the terrain contour design, and in response to the first control signals, move the cutting edge of the blade from beneath the terrain contour design to a location within a threshold distance from the terrain contour design. The system also includes one or more sensors configured to generate first sensor signals indicating that the cutting edge of the blade is within the threshold distance from the terrain contour design. In response to receiving the first sensor signals, the blade control system is configured to automatically control the cutting edge of the blade to the terrain contour design, where the movement of the blade is dependent on the terrain contour design.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art in light of this disclosure without departing from the invention. Therefore, the invention is not limited to particular embodiments disclosed herein.

Figure 1:
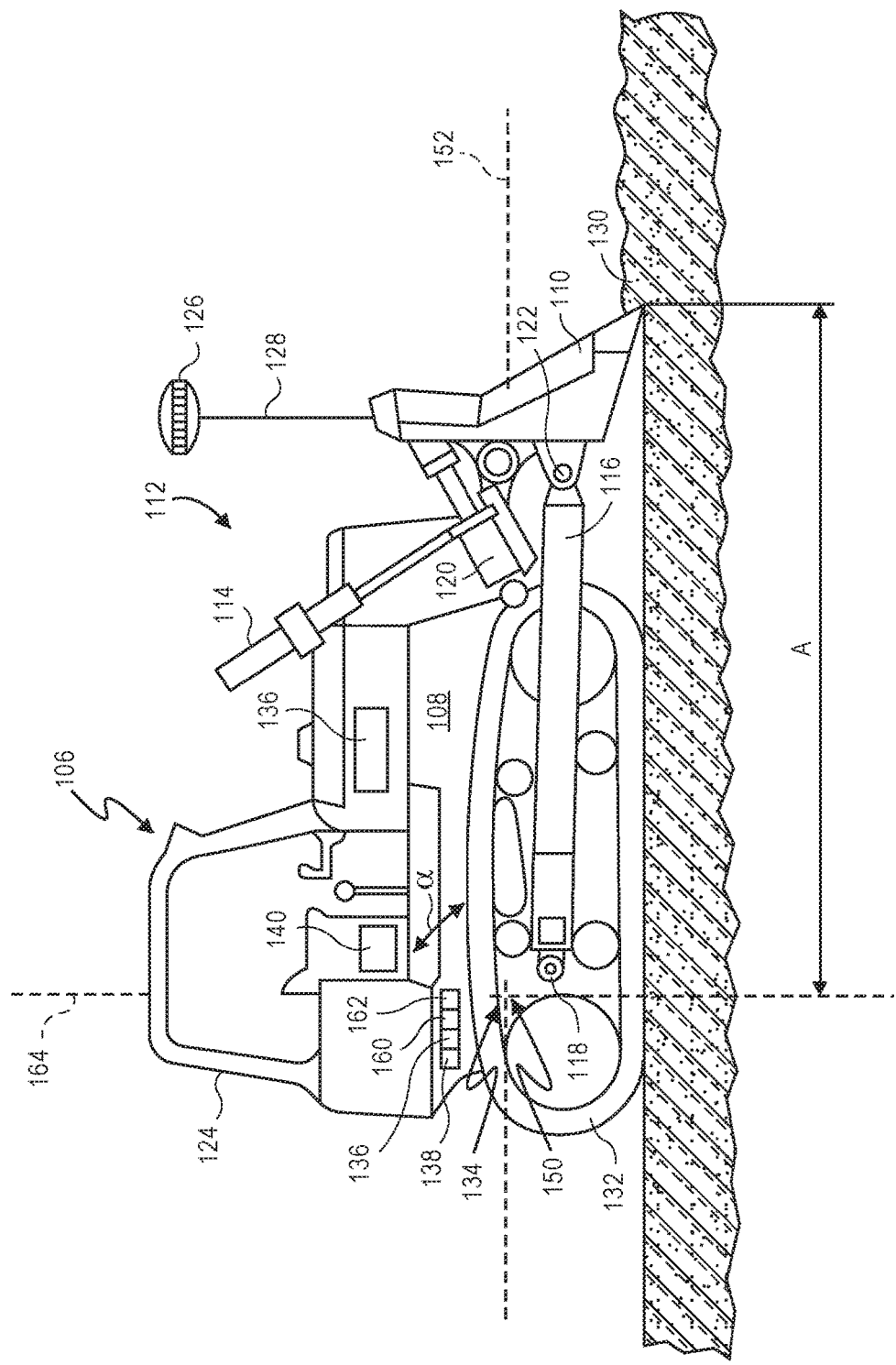
FIG. 1 is a schematic view of an exemplary earthmoving system.

FIG. 1 is a schematic view of an exemplary earthmoving system 106, which is a bulldozer. The various aspects and features of bulldozer 106 may be applied to other types of earthmoving systems, such as excavators, backhoes, front shovels, graders, and the like. Bulldozer 106 includes a frame 108 moved by track 132, and a cutting blade 110. The cutting blade 110 is supported by a blade support 112 that extends from the frame 108, and includes hydraulic lift cylinders 114 and a pair of arms 116.

In FIG. 1, only one of the pair of hydraulic lift cylinders 114 of the blade support 112 is shown. Lift cylinders 114 may be used for raising and lowering the blade 110 in relation to the frame 108. In FIG. 1, only one of the pair of arms 116 of the blade support 112 is shown. Arms 116 are attached to opposite ends of blade 110 and are pivotally attached to the frame 108 at pivot points 118, one of which is shown in FIG. 1.

Lift cylinders 114 can be extended or retracted to lower or to raise blade 110. During extension and retraction, arms 116 pivot about pivot points 118. Tilt cylinders 120 extend between the top of blade 110 and arms 116 and may be used to pivot the blade about pivot connection 122. Bulldozer 106 has a cab 124 from which an operator may manually operate various controls to control the operation of the bulldozer.

The earthmoving system 106 further includes GPS receivers 126, one of which can be seen in FIG. 1. The GPS receivers 126 are mounted on opposite ends of the cutting blade 110 on masts 128. In some embodiments, the GPS receivers are mounted on the cab and not on the blade. The GPS receivers 126 receive radio transmissions from satellites in orbit and, based on the transmissions, determine the respective positions of the GPS receivers 126 in three dimensional space. This information is supplied to a controller 140 on the bulldozer 106, and is used by the controller 140, along with, for example, blade position sensor information and terrain contour design information, to determine the location of the cutting blade 110, and in particular the location of the cutting edge 130 of the cutting blade 110. The terrain contour design information may be received, for example, from an onboard display. The controller 140 may be integrated with the bulldozer 106 when the bulldozer 106 is manufactured. Alternatively, the controller 140 may be added later to the bulldozer 106. For example, the controller 140 may be added as part of an aftermarket blade mount system.

When the bulldozer 106 is travelling across the job site, the frame 108 will typically be subjected to various topological contours of the terrain. As a consequence, the frame 108 may pitch forward and aft, pitch side to side, yaw from side to side, and bounce up and down. All of these movements of the frame will directly affect the position of the cutting blade 110. For example, when the frame 108 pitches fore and aft, the cutting blade 110 may substantially rotate about a generally horizontal axis, that is perpendicular to the direction of travel, and that extends through the center of gravity 134 of the bulldozer 106.

When the frame 108 pitches from side to side, the position of the blade 110 is impacted. This movement is, in effect, rotation of the frame 108 about an axis that extends longitudinally with respect to the bulldozer 106 and passes through its center of gravity. This causes the tilt angle of the blade 110 to fluctuate.

Yawing of the frame 108, that is, rotating the frame 108 about a generally vertical axis, changes the orientation of the blade 110. Yawing moves the blade 110 to the side and changes the anticipated path of the bulldozer 106. Finally, when the frame 108 is bounced vertically as the bulldozer is driven over rough ground at the job site, the blade 110 will typically be bounced vertically, as well.

Figure 2:
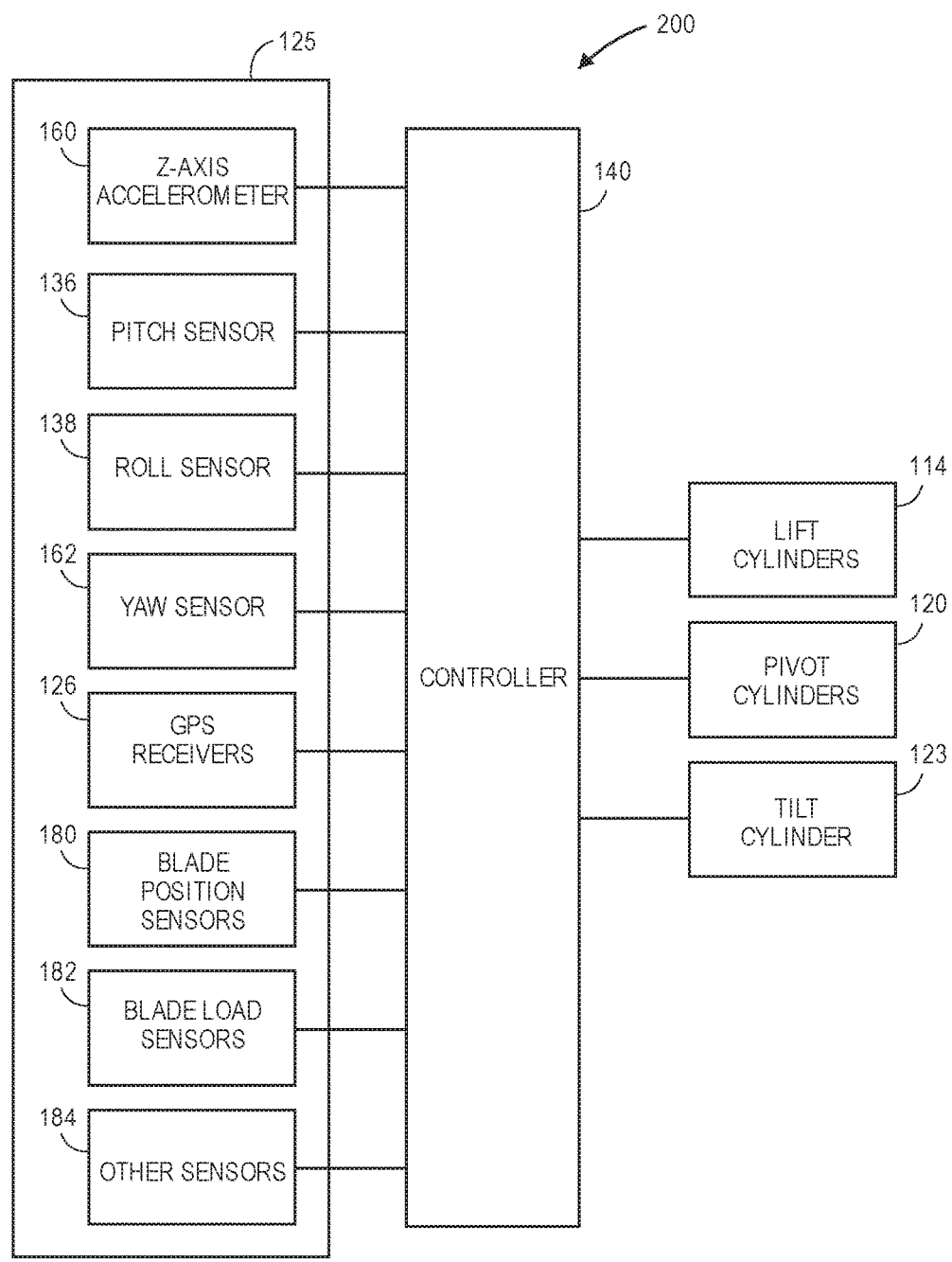
FIG. 2 is a block diagram of an exemplary control system of the earthmoving system of FIG. 1.

The system of FIGS. 1 and 2 monitors vertical movement of the frame 108, pitching movement fore and aft of the frame 108 about a horizontal transverse axis, rolling movement of the frame 108 about a longitudinally extending axis, and yawing of the frame 108 about a generally vertical axis at rates that are higher than the rate at which the system repetitively recalculates the positions of the GPS receivers 126. As a consequence, compensation for the frame movement which would otherwise be passed on to the blade 110 can be made by actuating the hydraulic lift cylinders 114 and 123 which control the position of the blade 110 with respect to the frame 108.

A first gyroscopic sensor 136 may be provided for sensing rotation of the frame 108 about an axis 150 that is generally transverse to the bulldozer and that passes through the center of gravity of the bulldozer. The sensor 136 provides an output that is related to the rate of rotation about axis 150. A second gyroscopic sensor 138 may be provided for sensing rotation of the frame 108 about an axis 152 that is generally longitudinal with respect to the bulldozer 106 and that passes through the center of gravity 134 of the bulldozer. The sensor 138 provides an output that is related to the rate of rotation about axis 152.

A controller 140 is responsive to the GPS receivers 126 and to the first and second gyroscopic sensors 136 and 138, and controls the operation of the hydraulic lift cylinders 114 and 123, and thereby the position of the cutting blade 110. The controller 140 monitors the position of the cutting blade 110 with repeated calculations based on the outputs of the GPS receivers 126 and may additionally use low-latency feed-forward correction of the repeated calculations based on the outputs of the first and second gyroscopic sensors 136 and 138. Based upon the outputs of the first and second gyroscopic sensors 136 and 138, the controller 140 determines the changes in the position of the cutting blade 110 that result from movement of the frame 108 of the bulldozer 106. The controller 140 updates the actual position of the cutting blade 110 based upon the outputs of the GPS receivers 126 and the sensors.

An accelerometer 160 may also be mounted on the frame 108 of the bulldozer for sensing generally vertical movement of the entire frame 108. The accelerometer 160 provides a vertical acceleration output to the controller 140, whereby the controller 140 may determine changes in the position of the frame which may be transmitted to the cutting blade based on the output of the accelerometer. The controller 140 monitors the position of the cutting blade 110 with repeated calculations based on the outputs of the GPS receivers 126 and with, for example, low-latency feed-forward correction of the repeated calculations based on the outputs of the first and second gyroscopic sensors 136 and 138 and the accelerometer 160.

The controller 140 may also be responsive to the GPS receivers 126 to determine the heading of the bulldozer 106. The system may further comprise a third gyroscopic sensor 162 that senses rotation of the frame about a generally vertical axis 164 that passes through the center of gravity 134 of the bulldozer 106. The generally vertical axis 164 is perpendicular to both the axis 150 generally transverse to the bulldozer and the axis 152 generally longitudinal with respect to the bulldozer. The controller 140 monitors the heading of the bulldozer with repeated calculations based on the outputs of the GPS receivers 126 and with, for example, low-latency feed-forward correction of the repeated calculations based on the output of the third gyroscopic sensor 162.

In some embodiments, one or more of the sensors 125 discussed herein may be housed in a single unit, which may be referred to, for example, as a sensor.

In some embodiments, controller 140 is additionally configured to receive inputs from a manual control system operated by an operator of the earthmoving system manually operating the earthmoving system, and to generate signals which move the blade according to the received inputs. Accordingly, operators use controller 140 to manually control the earthmoving system based, for example, on visual cues to the operator. In some embodiments, a separate controller is used for manual operation of the earthmoving system.

The aspects and principles related to blade control discussed herein may be applied to other earthmoving systems. For example, the aspects and principles related to blade control discussed herein may be applied to bulldozers having other configurations, control systems, and working implements corresponding with or similar to the blades discussed herein. For example, the aspects and principles related to blade control discussed herein may be applied to bulldozers having a C-frame blade control mechanism. In addition, the aspects and principles related to blade control discussed herein may be applied to other types of earthmoving systems, such as excavators, backhoes, front shovels, graders, and the like, where the earthmoving systems each have a control system, and one or more working implements corresponding with or similar to the blades discussed herein.

FIG. 2 is a schematic block diagram of an exemplary control system 200 of the earthmoving system of FIG. 1. The control system 200 includes sensors 125. In the embodiment illustrated in FIG. 2, sensors 125 include GPS receivers 126, gyroscopic position sensors 136, 138, and 162, Z-axis accelerometer 160, which generate sensor signals for controller 140. Sensors 125 also include blade position sensors 180, blade load sensors 182, and other sensors 184.

The GPS receivers 126 provide fixed reference positions with respect to the blade 110. If desired, however, this system may be implemented with other types of position sensors or combinations of types of position sensors mounted on the blade 110 or on masts 128 carried by the blade. For example, pairs of laser receivers, sonic trackers, total station targets or prisms, or other types of fixed reference position sensors may be provided on the blade 110 in lieu of the GPS receivers. Alternatively, combinations of these sensors or a combination of one of these sensors with a blade slope sensor may be used.

Blade position sensors 180 are configured to generate signals which may be used by controller 140 to determine a position of the blade 110 with respect to one or more other portions of the earthmoving system 106. Blade load sensors 182 are configured to generate signals which may be used by controller 140 to determine the load being carried with blade 110. Other sensors 184 may be configured to generate signals providing other information to controller 140, which controller 140 may automatically control the position of blade 100 or other operations of the earthmoving system. Blade position sensors 180, blade load sensors 182, and other sensors 184 are not illustrated in FIG. 1.

In some embodiments, one or more of Z-axis accelerometer 160, pitch sensor 136, roll sensor 138, yaw sensor 162, GPS receivers 126, blade position sensors 180, blade load sensors 182, and other sensors 184 are omitted.

Based on sensor signals from sensors 125, on a terrain contour design electronically stored in a memory accessible to or part of controller 140, and on a set of automatic blade control instructions, controller 140 executes the instructions to generate control signals for lift cylinders 114, and tilt cylinder 120. The control signals respectively control the position of lift cylinders 114, and tilt cylinder 120 so as to cause the blade to be in a determined position. For example, the control signals may respectively control the application of hydraulic fluid to each of lift cylinders 114, and tilt cylinder 120.

In alternative embodiments, a blade or other similar tool may be controlled by one or more control mechanisms other than or in addition to lift cylinders 114 and tilt cylinder 123.

In some embodiments, the automatic blade control instructions for controller 140 cause controller 140 to take control of the position of the blade once the blade reaches or is within a threshold of the terrain contour design. For example, an operator may manually control the earthmoving system and the blade of the earthmoving system, and once the manual control causes the blade to come within a threshold distance of the terrain contour design, the controller 140 automatically takes control of the position of the blade, such that the blade or a cutting edge of the blade is substantially fixed to or controlled to the terrain contour design. In some embodiments, the threshold is 0, such that the controller 140 automatically takes control of the position of the blade in response to the blade contacting the terrain contour design. In some embodiments, the threshold is negative, such that the controller 140 automatically takes control of the position of the blade in response to the blade extending past the design a prescribed distance.

In some embodiments, the automatic blade control instructions for controller 140 cause controller 142 control the position of the blade so as to maintain a substantially constant blade load. For example, based on inputs from blade load sensors 182, controller 140 may determine that a target blade load is being carried by the earthmoving system. In response to the determination, controller 140 may take control of the position of the blade to cause adjustments to the blade position which result in the load being substantially constant as the earthmoving system carries the load. In some embodiments, controller 140 is configured to generate signals which cause the earthmoving system to raise the blade in response to signals from blade load sensors 182 indicating that the load is greater than the target load. Similarly, controller 140 may be configured to generate signals which cause the earthmoving system to lower the blade in response to signals from blade load sensors 182 indicating that the load is less than the target load.

In some embodiments, the automatic blade control instructions for controller 140 cause controller 142 control the position of the blade so as to maintain a substantially constant speed or track slippage. For example, based on inputs from sensors 125 indicating a speed or track slippage of the earthmoving system, controller 140 may determine blade position. For example, controller 140 may be configured to generate signals which cause the earthmoving system to raise the blade in response to signals from sensors 125 indicating that the speed is less than a target speed or that the track slippage is greater than a target track slippage. Similarly, controller 140 may be configured to generate signals which cause the earthmoving system to lower the blade in response to signals from sensors 125 indicating that the speed is greater than the target speed or that the track slippage is less than the target track slippage.

In some embodiments, the automatic blade control instructions for controller 140 cause controller 142 control the position of the blade so that one or both of a blade angle relative to horizon or gravity in the plane perpendicular to horizon and parallel to the motion, and a blade incline relative to horizon or gravity in the plane perpendicular to the motion is substantially constant despite changes in position and orientation of the frame of the earthmoving system.

In some embodiments, the automatic blade control instructions for controller 140 cause controller 142 control the position of the blade so that the blade takes one of a number of predetermined positions. For example, an operator may program the blade to take a first position associated with a loading operation, during which the blade is loaded as the blade acquires material. Additionally, the operator may program the blade to take a second position associated with a carrying operation, during which the load is carried from one position to another. Furthermore, the operator may program the blade to take a third position associated with a spreading operation, during which the load is spread.

In some embodiments, the automatic blade control instructions for controller 140 cause controller 142 to control a change in the position of the blade while a load is spread. For example, controller 140 may control the rate at which the blade is tilted forward while a load is being spread. Additionally or alternatively, controller 140 may control a rate at which the blade is lifted while the load is being spread.

In some embodiments, the automatic blade control instructions for controller 140 cause controller 142 to control the position of the blade according to other desired results.

FIGS. 3A-3H illustrate a sequence of stages of a grading task performed by an earthmoving system according to some embodiments.

Figure 3:
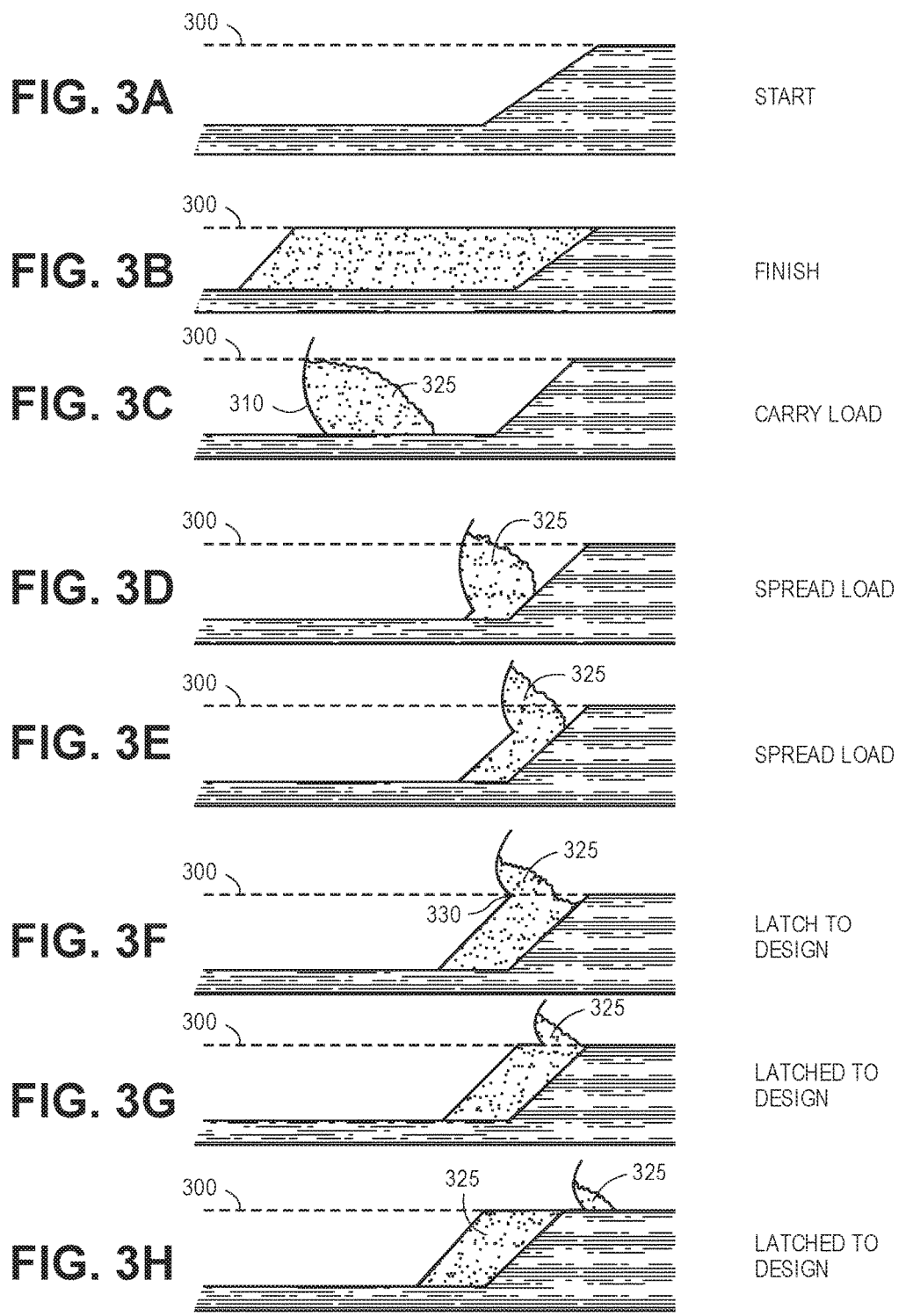
FIGS. 3A-3H illustrate a sequence of stages of a grading task performed by an earthmoving system according to some embodiments.

FIG. 3A illustrates a cross-sectional view of a tract of land prior to a grading task being performed. FIG. 3B illustrates a cross-sectional view of the tract of land after the grading task has been performed. As indicated, a goal of the grading task is to fill an area beneath a terrain contour design 300, which has been stored in a memory of the earthmoving system so as to be accessible by a controller of the earthmoving system.

FIGS. 3C-3H are cross-sectional views of the tract of land at various stages of the grading task. During the represented portion of the grading task, a load 325 is carried and spread with automatic blade control according to some embodiments. For clarity, only the blade 310 of the earthmoving system is illustrated in FIGS. 3C-3H.

FIG. 3C illustrates a portion of the grading task during which the load 325 is carried. As illustrated, the load 325 is carried with the blade 310 being beneath terrain contour design 300. In some embodiments, the load 325 may be carried by the earthmoving system in response to manual control from an operator. In some embodiments, the load 325 may be partially or entirely carried by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

FIGS. 3D and 3E each illustrate a portion of the grading task during which the load 325 is spread. As illustrated, the load 325 is spread with the blade 310 being beneath terrain contour design 300. In some embodiments, the load 325 may be spread by the earthmoving system in response to manual control from an operator. In some embodiments, the load 325 may be partially or entirely spread by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

FIG. 3F illustrates another portion of the grading task during which the load 325 is spread. As illustrated, the blade 310 has been controlled so that the cutting edge 330 of the blade 310 is within a threshold distance of terrain contour design 300. The threshold distance may be a fixed distance (e.g., 1 inch), and adjustable distance, or a variable distance that is dependent on factors such as operator input, operating conditions, terrain contour design 300, and the like. The controller may determine that the cutting edge 330 of the blade 310 is within the threshold distance of the terrain contour design 300 based, for example on sensor input signals.

In response to the cutting edge 330 of the blade 310 being within the threshold distance of terrain contour design 300, the controller latches the cutting edge 330 of the blade 310 to the terrain contour design 300. For example, in response to the cutting edge 330 of the blade 310 being within the threshold distance of terrain contour design 300, the controller controls the blade 310 such that the cutting edge 330 of the blade is substantially fixed to or controlled to terrain contour design 300 as the earthmoving system further carries or spreads the remnant of the load 325.

FIGS. 3G and 3H respectively illustrate other portions of the grading task during which the remnant of load 325 is spread and carried. During the portions of the grading task illustrated in FIGS. 3G and 3H, the remnant of load 325 is spread and carried with the blade 310 being latched to terrain contour design 300.

In alternative embodiments, prior to the load 325 being carried, as illustrated in FIG. 3C, the load 325 may be loaded onto blade 310 with a loading operation. In such embodiments, the load 325 may be loaded onto blade 310 while the cutting edge 330 of blade 310 is beneath terrain contour design 300. In some embodiments, the load 325 may be loaded onto blade 310 in response to manual control from an operator. In some embodiments, the load 325 may be partially or entirely loaded according to automatic blade control instructions executed by the controller of the earthmoving system. For example, the controller may be programmed with and operate according to automatic blade control instructions similar or identical to any of the automatic blade control instructions discussed elsewhere herein.

In some embodiments, one or more of the steps or stages represented in FIGS. 3A-3G are not performed.

In some embodiments, the operator may cause the blade 310 to again respond to manual controls by generating a signal for the controller. In response to the signal, the controller terminates automatic blade control.

Figure 4:
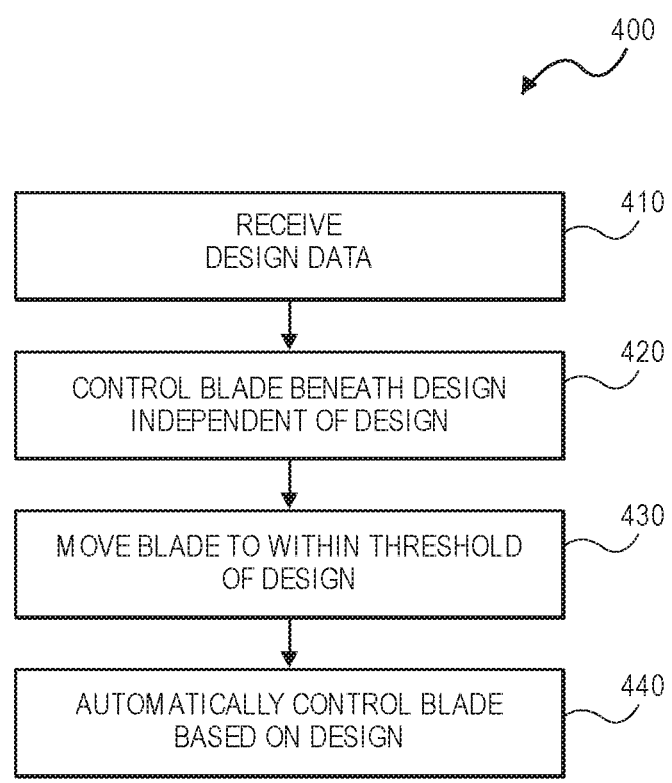
FIG. 4 is a flowchart diagram of a method according to some embodiments.

FIG. 4 is a flowchart diagram of a method 400 according to some embodiments. In the method 400, while performing a grading task, a blade of an earthmoving system is controlled beneath a terrain contour design and is subsequently automatically controlled such that the cutting edge of the blade is substantially fixed to or controlled to the terrain contour design.

At 410, a controller of the earthmoving system accesses the terrain contour design.

During the method 400, using techniques discussed elsewhere herein, the controller determines and monitors the position of the cutting edge of the blade to determine whether the cutting edge of the blade is moved to a position within a threshold from the terrain contour design.

At 420, the blade of the earthmoving system is controlled beneath the terrain contour design. For example, the blade of the earthmoving system may be controlled to perform one or more grading operations with the cutting edge of the blade being beneath the terrain contour design, such that control of the blade is independent of the terrain contour design.

In some embodiments, the grading operations may be performed by the earthmoving system in response to manual control from an operator. In some embodiments, the grading operations may be partially or entirely performed by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

At 430, in response to manual control from the operator or in response to signals generated by a controller in response to automatic blade control instructions, the cutting edge of the blade is moved to within a threshold distance of the terrain contour design.

At 440, the controller determines that the cutting edge of the blade has been moved to within the threshold distance of the terrain contour design. In response to the determination, the controller takes control of the blade position, and causes the blade to be positioned such that the cutting edge of the blade is substantially fixed to or controlled to the terrain contour design as the earthmoving system performs further grading operations.

In some embodiments, one or more of the steps or stages represented in FIG. 4 are not performed or may be performed in a different order.

Figure 5:
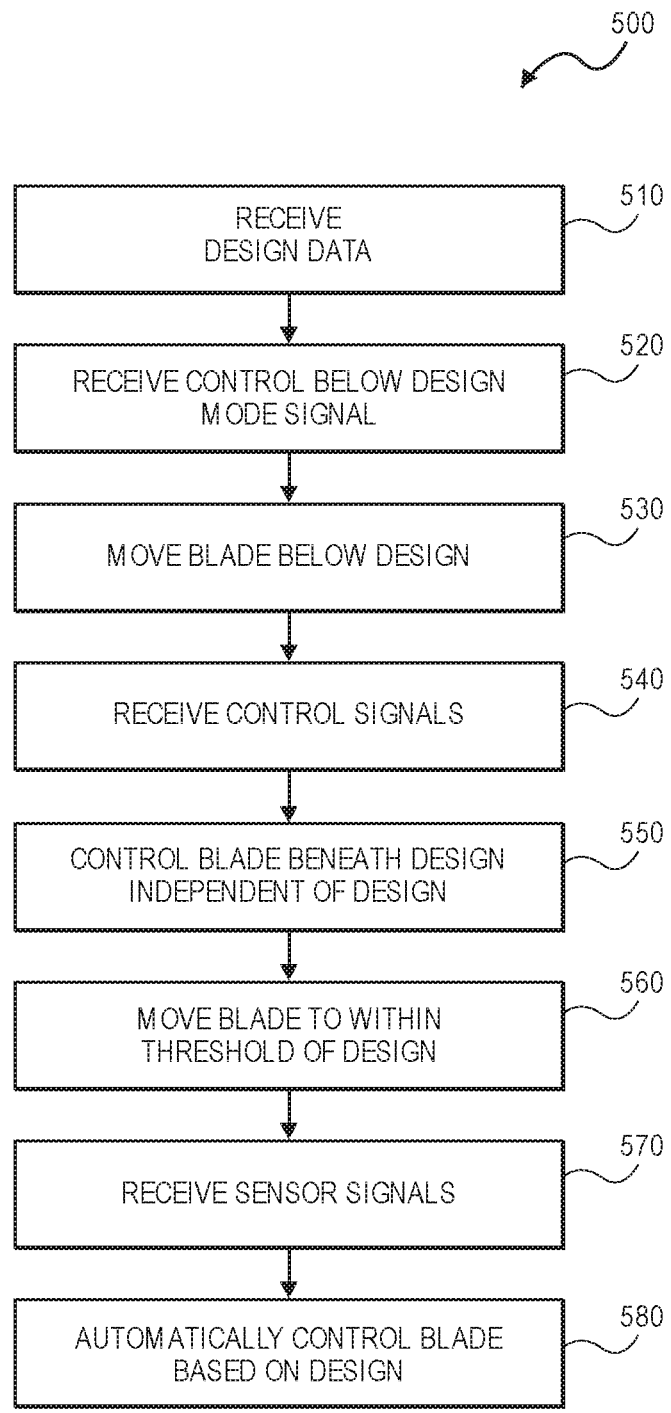
FIG. 5 is a flowchart diagram of a method according to some embodiments.

FIG. 5 is a flowchart diagram of a method 500 according to some embodiments. In the method 500, while performing a grading task, a blade of an earthmoving system is controlled beneath a terrain contour design and is subsequently automatically controlled such that the cutting edge of the blade is substantially fixed to or controlled to the terrain contour design.

At 510, a controller of the earthmoving system accesses or receives the terrain contour design.

During the method 500, using techniques discussed elsewhere herein, the controller determines and monitors the position of the cutting edge of the blade to determine whether the cutting edge of the blade is moved to a position within a threshold from the terrain contour design.

At 520, the controller receives a signal, for example, from an operator, encoding an instruction for the controller to enter or enable a mode of operation allowing for blade control while the cutting edge of the blade is below the terrain contour design.

At 530, the blade of the earthmoving system is controlled such that the cutting edge of the blade is moved so as to be beneath the terrain contour design. For example, the blade of the earthmoving system may be controlled to move beneath the terrain contour design as a result of performing a grading operation. In some embodiments, the grading operations may be performed by the earthmoving system in response to manual control from an operator. In some embodiments, the grading operations may be partially or entirely performed by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

At 540, the controller of the earthmoving system receives one or more control signals. In some embodiments, the control signals may be generated by the earthmoving system in response to manual control from an operator. In some embodiments, the control signals may be generated by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

At 550, the controller of the earthmoving system controls the blade of the earthmoving system in response to the one or more control signals. The blade of the earthmoving system is controlled beneath the terrain contour design. For example, the blade of the earthmoving system may be controlled to perform one or more grading operations with the cutting edge of the blade being beneath the terrain contour design, such that control of the blade is independent of the terrain contour design.

At 560, the controller of the earthmoving system controls the blade such that the cutting edge of the blade is moved to within a threshold distance of the terrain contour design. For example, the blade of the earthmoving system may be controlled to move within the threshold distance of the terrain contour design as a result of performing a grading operation. In some embodiments, the grading operations may be performed by the earthmoving system in response to manual control from an operator. In some embodiments, the grading operations may be partially or entirely performed by the earthmoving system according to automatic blade control instructions executed by the controller of the earthmoving system. For example, the controller may be programmed with and operate according to automatic blade control instructions similar or identical to any of the automatic blade control instructions discussed elsewhere herein.

At 570, the controller receives sensor signals from one or more sensors indicating that the cutting edge of the blade has been moved to within the threshold distance of the terrain contour design.

At 580, in response to the sensor signals, the controller determines that the cutting edge of the blade has been moved to within the threshold distance of the terrain contour design. In response to the determination, the controller takes control of the blade position, and causes the blade to be positioned such that the cutting edge of the blade is substantially fixed to or controlled to the terrain contour design as the earthmoving system performs further grading operations.

In some embodiments, one or more of the steps or stages represented in FIG. 5 are not performed or may be performed in a different order.

Though the present invention is disclosed by way of specific embodiments as described above, those embodiments are not intended to limit the present invention. Based on the methods and the technical aspects disclosed above, variations and changes may be made to the presented embodiments by those skilled in the art in light of this disclosure without departing from the spirit and the scope of the present invention.

What is claimed is:

1. A method of controlling a blade of an earthmoving system, the method comprising:
  with a controller, accessing data representing a terrain contour design;
  with the controller, enabling independent blade control so that the blade is controllable independent of the terrain contour design while a cutting edge of the blade is beneath the terrain contour design;
  with the controller, moving the cutting edge of the blade to a position beneath the terrain contour design;
  with the controller, receiving first control signals;
  with the controller, controlling a movement of the blade to achieve an operational objective, wherein the movement is controlled in response to the received first control signals while the cutting edge of the blade is beneath the terrain contour design,
  wherein the movement of the blade is independent of the terrain contour design, and thereafter, moving the cutting edge of the blade from beneath the terrain contour design to a location within a threshold distance from the terrain contour design;
  with the controller, receiving first sensor signals from one or more first sensors of the earthmoving system, wherein the first sensor signals indicate that the cutting edge of the blade is within the threshold distance from the terrain contour design; and with the controller, in response to receiving the first sensor signals, automatically controlling the cutting edge of the blade to the terrain contour design, wherein the movement of the blade is dependent on the terrain contour design.

2. The method of claim 1, wherein the first control signals are generated in response to an operator manually operating the earthmoving system.

3. The method of claim 1, wherein the first control signals are generated by the controller executing automatic blade control instructions.

4. The method of claim 1, wherein moving the cutting edge of the blade to the position beneath the terrain contour design comprises:

receiving second control signals from an operator manually operating the earthmoving system; and moving the cutting edge of the blade in response to the second control signals.

5. The method of claim 1, wherein moving the cutting edge of the blade to the position beneath the terrain contour design comprises:

receiving second control signals from the controller executing automatic blade control instructions; and moving the cutting edge of the blade in response to the second control signals.

6. The method of claim 1, wherein the cutting edge of the blade is moved from beneath the terrain contour design to a location within the threshold distance from the terrain contour design in response to receiving third control signals from an operator manually operating the earthmoving system.

7. The method of claim 1, wherein the cutting edge of the blade is moved from beneath the terrain contour design to a location within the threshold distance from the terrain contour design in response to receiving third control signals from the controller executing automatic blade control instructions.

8. The method of claim 1, wherein controlling the movement of the blade in response to the received first control signals while the cutting edge of the blade is beneath the terrain contour design comprises executing instructions which cause the controller to control the position of the blade so as to maintain a substantially constant blade load.

9. The method of claim 1, wherein controlling the movement of the blade in response to the received first control signals while the cutting edge of the blade is beneath the terrain contour design comprises executing instructions which cause the controller to control the position of the blade so as to maintain a substantially constant speed or track slippage.

10. The method of claim 1, wherein controlling the movement of the blade in response to the received first control signals while the cutting edge of the blade is beneath the terrain contour design comprises executing instructions which cause the controller to control the position of the blade so that one or both of a blade angle relative to gravity and a blade incline relative to gravity is substantially constant despite changes in position and orientation of the frame of the earthmoving system.

11. The method of claim 1, wherein controlling the movement of the blade in response to the received first control signals while the cutting edge of the blade is beneath the terrain contour design comprises executing instructions which cause the controller to control the position of the blade so that the blade takes one of a number of predetermined positions.

12. The method of claim 1, wherein controlling the movement of the blade in response to the received first control signals while the cutting edge of the blade is beneath the terrain contour design comprises executing instructions which cause the controller to control a change in the position of the blade while a load is being spread.

13. An earthmoving system, comprising:

a blade comprising a cutting edge;

a controller configured to:

access data representing a terrain contour design, and generate first control signals for controlling the position of the blade;

a blade control system configured to:

control a movement of the blade to achieve an operational objective, wherein the movement is controlled in response to the first control signals while the cutting edge of the blade is beneath the terrain contour design, wherein the movement of the blade is independent of the terrain contour design, and in response to the first control signals, move the cutting edge of the blade from beneath the terrain contour design to a location within a threshold distance from the terrain contour design; and one or more sensors configured to generate first sensor signals indicating that the cutting edge of the blade is within the threshold distance from the terrain contour design, wherein in response to receiving the first sensor signals, the blade control system is configured to automatically control the cutting edge of the blade to the terrain contour design, wherein the movement of the blade is dependent on the terrain contour design.

14. The system of claim 13, wherein the first control signals are generated in response to an operator manually operating the earthmoving system.

15. The system of claim 13, wherein the first control signals are generated by the controller executing automatic blade control instructions.

16. The system of claim 15, wherein the instructions cause the controller to control the position of the blade so as to maintain a substantially constant blade load.

17. The system of claim 15, wherein the instructions cause the controller to control the position of the blade so as to maintain a substantially constant speed or track slippage.

18. The system of claim 15, wherein the instructions cause the controller to control the position of the blade so that one or both of a blade angle relative to gravity and a blade incline relative to gravity is substantially constant despite changes in position and orientation of a frame of the earthmoving system.

19. The system of claim 15, wherein the instructions cause the controller to control the position of the blade so that the blade takes one of a number of predetermined positions.

20. The system of claim 15, wherein the instructions cause the controller to control a change in the position of the blade while a load is being spread.

* * * * *